United States Patent [19]

Gutterman

[11] Patent Number: 4,555,951
[45] Date of Patent: Dec. 3, 1985

[54] REFLECTIVE ACOUSTIC FLUID FLOW METER

[75] Inventor: Jeffrey S. Gutterman, Hilton, N.Y.

[73] Assignee: General Motors Corporation, Detroit, Mich.

[21] Appl. No.: 643,560

[22] Filed: Aug. 23, 1984

[51] Int. Cl.$^4$ ............................................. G01F 1/66
[52] U.S. Cl. ............................................. 73/861.28
[58] Field of Search ...................... 73/862.26–862.31

[56] References Cited

U.S. PATENT DOCUMENTS 4,195,517  4/1980  Kalinoski et al. ............... 73/861.28
4,308,754  1/1982  Pedersen et al. ............... 73/861.28

Primary Examiner—Charles A. Ruehl
Attorney, Agent, or Firm—Warren D. Hill

[57] ABSTRACT

In one embodiment, a first air flow meter includes a pair of ultrasonic transducers mounted on one wall of a conduit, and an opposite reflective wall is shaped to focus acoustic signals from one transducer to the other. In a second embodiment, the opposite wall is separated into a stepped series of cylindrical reflective surfaces spaced from the transducers by different distances, each surface being one-half wavelength from its adjoining surfaces so that constructive combination of the acoustic signals occurs. For noise of the same wavelength emitted at sources axially spaced from the transducers, the reflective surfaces appear to be spaced by approximately ¾-wavelength steps so that reflected noise signals tend to cancel.

2 Claims, 4 Drawing Figures

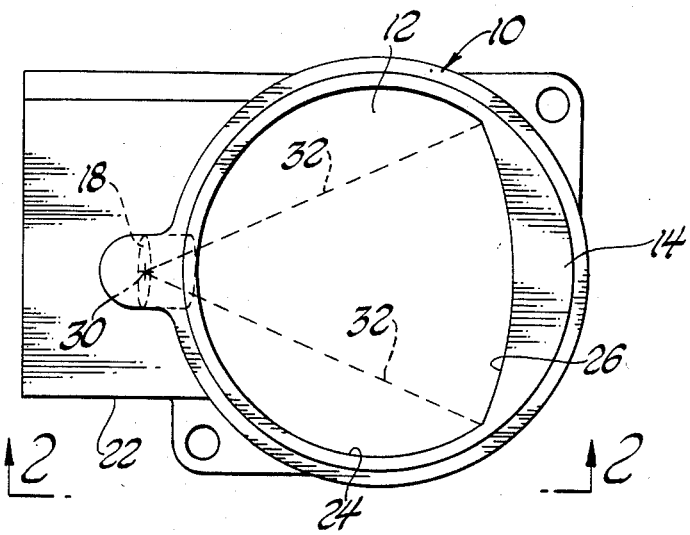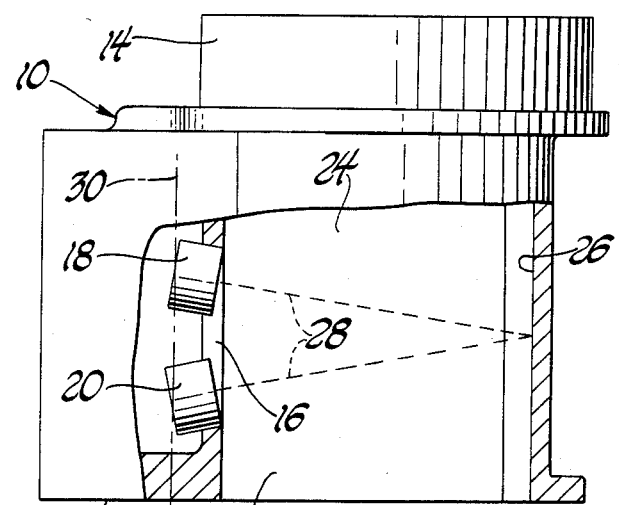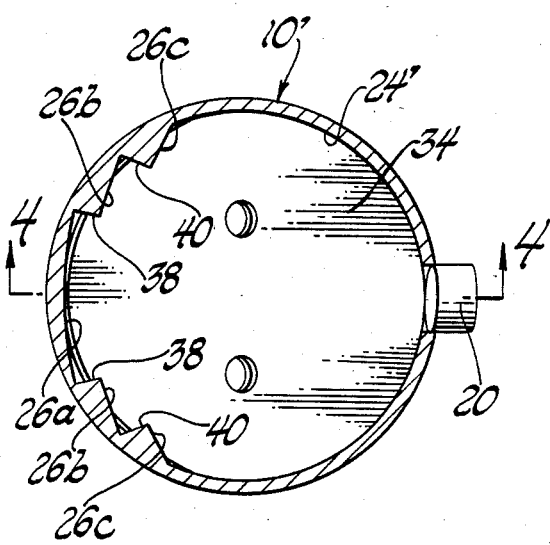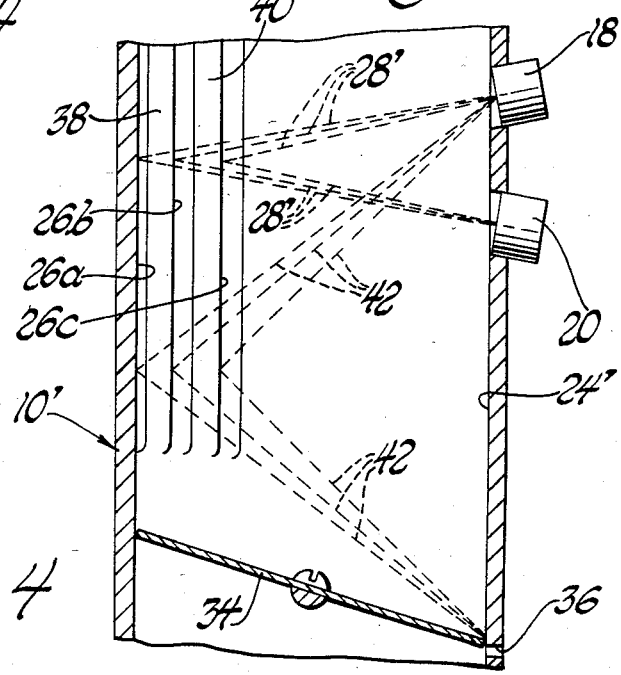

REFLECTIVE ACOUSTIC FLUID FLOW METER

This invention relates to an acoustic fluid flow meter and particularly to such a meter using acoustic signals reflected from a conduit wall. It is well known to measure fluid flow, such as mass air flow, for example, by acoustic instruments operating in the ultrasonic range. Such apparatus usually involves a pair of ultrasonic transducers which alternately emit acoustic signals and, after the signals pass through the fluid being measured, receive the signals. Electronic circuitry analyzes the relationship of the transmitted and received signals to arrive at a measure of the fluid velocity or mass flow. Specific examples of such apparatus are disclosed in my copending patent applications "Dual Frequency Acoustic Fluid Flow Method and Apparatus", U.S. Ser. No. 548,994 filed Nov. 7, 1983 and "Method and Apparatus for Measuring Fluid Flow", U.S. Ser. No. 545,258 filed Oct. 25, 1983. In such apparatus, as in the case of any measuring instrumentation, it is desirable to maximize the signal-to-noise ratio of the received signal and to minimize any spurious data resulting from false signals. It is also desirable in order to measure a representative value of fluid flow to sample a large percentage of the fluid that is being measured. This latter objective is more easily met by reflective techniques than by direct transmission from one transducer to another.

It is, therefore, a general object of the invention to provide a reflective acoustic fluid flow meter having a strong signal reflected to receiving transducers. It is another object of the invention to provide such a meter having an improved signal-to-noise ratio.

The invention is carried out by providing a conduit with upstream and downstream ultrasonic transducers mounted in one wall with the opposite conduit wall formed for optimum reflection of an acoustic signal from one transducer to the other and particularly wherein the reflective wall comprises one or more circular cylindrical segments, each having a center of curvature passing through the transducers so that the reflective signal from one transducer is focused onto the other transducer. The invention is further carried out by utilizing a reflective surface where individual reflective cylindrical segments are variably spaced from the transducers by one-half wavelength distances so that signals from one transducer to another are constructively combined at the receiving transducer whereas noise from sources axially spaced from the transducers tends to destructively interfere after reflection, to thereby minimize noise signals at the receiving transducer.

The above and other advantages of the invention will become apparent from the following description and the accompanying drawings wherein like reference numerals refer to like parts and wherein:

FIG. 1 is a plan view of a reflective acoustic fluid flow meter according to the invention;

FIG. 2 is a partially sectioned elevational view of the fluid flow meter of FIG. 1;

FIG. 3 is a cross sectional plan view of a fluid flow meter according to another embodiment of the invention; and FIG. 4 is a schematic illustration of the acoustical operation of the FIG. 3 embodiment of the invention.

This invention has a wide variety of applications; however, it is disclosed herein in the context of a mass air flow meter in the induction system of an automotive engine. Thus, the drawings depict a conduit which is the throttle body or a metering section upstream of the throttle body. Referring to FIGS. 1 and 2, a housing 10 defines an inner fluid flow passage 12 which is not circular in cross section but which has an upper flange 14 that is circular in its outer periphery to facilitate coupling with conventional circular parts, i.e., an air cleaner assembly or an air induction hose. An elongated opening 16 in one side of the housing 10 allows upstream and downstream piezoelectric ultrasonic transducers 18 and 20, respectively, to be mounted adjacent the inner passage 12. A lateral housing extension 22 contains the transducers 18 and 20 and associated electronic circuitry, not shown. The inner walls which define the air passage 12 are comprised of two circular cylindrical sections including a first wall section 24 which subtends an arc of about 250° and which adjoins a second wall section 26 which completes the passage 12 but which has a radius of curvature about twice that of the first section 24. The opening 16 containing the transducers 18 and 20 is symmetrically located in the first wall section 24 and is opposite the second wall section 26 which serves as the reflecting surface for signals transmitted from one transducer to another.

In operation, an emitted signal is directed across the air passage 12 as indicated by dotted lines 28 in FIG. 2 and reflected by the second wall section 26 to again cross the passage and focus on the other transducer. The transducers alternate in their roles as transmitters and receivers of acoustic signals so that the acoustic energy from either transducer is focused by reflecting surface 26 onto the other transducer. To focus the acoustic signals, the reflecting surface 26 has its center of curvature or the axis 30 of the circular cylindrical segment passing through the transducers 18 and 20. The particular center of curvature or axis 30 may lie at the surface of the transducers or preferably at an axis 30 passing through the piezoelectric crystals of the transducers. The acoustic energy from the transducers is transmitted through a fan shaped sector indicated by dotted lines 32 of FIG. 1, thereby sweeping through most of the area of the passage 12 to sample a high percentage of the fluid flowing through the passage. Since the signal emitted from each transducer is focused onto the other transducer by the reflecting wall 26, a strong acoustic signal is transmitted.

Typical dimensions for the meter are 55 mm inner diameter of the first wall section 24, a 51 mm radius of curvature of the reflecting wall 26 with the center of curvature axis 30 passing 5 mm behind the opening 16. The transducers are 16 mm in diameter and are spaced 20 mm center-to-center. To optimize the transmission efficiency, each of the transducers 18, 20 is tilted about 10° toward the other as shown in FIG. 2.

Since the transducers 18 and 20 are efficient receivers of ultrasonic energy at the preferred frequency of operation (on the order of 35 to 50 kHz), they are able to receive noise of the same frequency. Of course, the transducers receive noise of other frequencies, but it is subject to electrical filtering. In the case of automotive induction systems, as shown in FIGS. 3 and 4, the throttle valve or blade 34 is a source of noise at the operating frequency. An idle bypass port 36 is uncovered just as the throttle blade begins to open and the rush of air past the port produces a whistle at the operating frequency. FIG. 3 depicts a stepped reflector design which may replace the simple cylindrical reflector 26 of FIGS. 1 and 2 and which frustrates noise at the operating frequency emanating at an axial distance from the transducers. According to that design, the housing 10' is generally circular in its outer periphery. The inner surface of the housing has a first wall 24' comprising a circular cylinder and supporting transducers 18 and 20, as in FIGS. 1 and 2. A reflecting wall opposite the transducers comprises a series of surfaces each comprising a section of a circular cylinder with its center of curvature or cylinder axis intersecting the transducers. A central reflective surface 26a directly opposite the transducers occupies a portion, about one-third, of the reflector surface, and it is flanked on either side by a cylindrical reflective surface 26b of smaller extent than surface 26a and having the same center of curvature but a smaller radius of curvature so that a shoulder or step 38 is formed between the two surfaces. Flanking each of the reflective surfaces 26b is still another set of reflective cylindrical surfaces 26c which also have the same center of curvature but a still shorter radius of curvature. Again another shoulder or step 40 is defined between the surfaces 26b and 26c. The step size or distance between adjacent surfaces, measured along the signal path, is one-half wavelength. At a frequency of 35 kHz, that distance would be 4.38 millimeters. Acoustic signals 28' emitted from a transducer 18 or 20 and reflected from adjacent surfaces will be in phase since those reflecting from the more distant surface will travel a whole wavelength farther than the wave reflecting from the adjacent surface. They will combine at the receiving transducer to form a strong signal. The step size is not critical since the constructive or destructive interference of the sound waves is quite effective for small variations from the ideal phase relationship. For example, for a given wavelength, the step size may vary +12% for 70% effectiveness.

The diagram of FIG. 4 illustrates the effect of a throttle blade whistle located about 82 mm downstream of the transducers where a throttle blade 34 in its closed position contacts the first wall section 24'. With a reflector design like that of FIGS. 1 and 2, the whistle noise could be focused by the reflector 26 onto either transducer 18 or 20. However, with the stepped reflector design of FIG. 3, the step distances of the reflectors as measured along the paths 42 of the noise is three-quarters of a wavelength at the operating frequency. Then the noise waves reflected from adjacent surfaces will be 180° out of phase, thereby destructively interfering to cancel the noise effects. This circumstance is true where the whistle noise is incident to the reflector surfaces at an angle of 48° to the normal plane. Noise sources which are not exactly positioned to result in the 48° angle will not be wholly cancelled by the reflected waves; however, effective noise signals will be greatly diminished even if they are close to that ideal position. Consequently, the stepped reflector arrangement is effective not only to focus the signal from one transducer to another at the operation frequency but also to diminish noise at the same frequency from axially spaced sources. In FIG. 4 the noise paths 42 are shown as directed to transducer 18. Similar paths directed to transducer 20 also exist. Complete noise cancellation will not occur for both sets of paths but substantial noise diminution will occur for the latter paths.

Thus it is apparent that the fluid flow meter according to one embodiment of this invention efficiently transmits an acoustic signal from one transducer to another while sampling a large area of the fluid-carrying conduit and, according to another embodiment, has the additional feature of suppressing noise of the same wavelengths as the acoustic signals from an axially spaced source.

The embodiments of the invention in which an exclusive property or privilege is claimed are defined as follows:

1. An acoustic fluid flow meter including a conduit for carrying fluid flow comprising
   a pair of acoustic transducers mounted on one wall of a conduit, one transducer being located upstream of the other such that acoustic signals emitted from either transducer reflect from an opposite wall to the other transducer, the opposite wall comprising one or more circular cylindrical reflecting surfaces each having a cylinder axis passing through the transducers so that signals from either transducer transmitted across the conduit and reflected from the reflecting surfaces will be focused on the other transducer.

2. An acoustic fluid flow meter including a conduit for carrying fluid comprising
   a pair of acoustic transducers for emitting signals at an operating wavelength mounted in one wall of a conduit, one transducer located upstream of the other such that acoustic signals emitted from either transducer reflect from an opposite wall to the other transducer, the opposite wall comprising a series of circular cylindrical reflecting surfaces each having a cylinder axis passing through the transducers so that signals from either transducer reflected from the reflecting surfaces will be focused on the other transducer, the reflecting surfaces being variably spaced from the transducers by about one-half wavelength multiples as measured along the signal path so that the reflected signals constructively combine at receiving transducers while noise emitted at regions upstream or downstream of the transducers and reflected from the reflecting surfaces will, to some degree, destructively interfere and thereby be minimized at a receiving transducer.

* * * * *

UNITED STATES PATENT AND TRADEMARK OFFICE
CERTIFICATE OF CORRECTION

PATENT NO. : 4,555,951

DATED : December 3, 1985

INVENTOR(S) : Jeffrey S. Gutterman

It is certified that error appears in the above-identified patent and that said Letters Patent is hereby corrected as shown below:

Column 3, line 35, delete +12% and insert -- $\pm$12% --.

Signed and Sealed this

Seventh Day of April, 1987

Attest:

DONALD J. QUIGG

Attesting Officer

Commissioner of Patents and Trademarks